United States Patent
Czaja et al.

(10) Patent No.: US 9,020,782 B2
(45) Date of Patent: Apr. 28, 2015

(54) ADAPTIVE VIBRATION CONTROL FOR SKI

(71) Applicant: IPComm, Cardiff, CA (US)

(72) Inventors: Stanislaw Czaja, Cardiff, CA (US); Grzegorz Staszczuk, Warsaw (PL); Muhammad Afsar, San Diego, CA (US)

(73) Assignee: IPComm, Cardiff, CA (US)

( * ) Notice: Subject to any disclaimer, the term of this patent is extended or adjusted under 35 U.S.C. 154(b) by 0 days.

(21) Appl. No.: 14/065,060

(22) Filed: Oct. 28, 2013

(65) Prior Publication Data

US 2014/0244071 A1    Aug. 28, 2014

Related U.S. Application Data

(63) Continuation-in-part of application No. 13/024,070, filed on Feb. 9, 2011, now Pat. No. 8,612,181.

(51) Int. Cl.
| | |
|---|---|
| G06F 11/00 | (2006.01) |
| G05D 19/02 | (2006.01) |
| A43B 3/00 | (2006.01) |
| A43B 5/04 | (2006.01) |
| A63C 5/06 | (2006.01) |
| A63C 9/00 | (2012.01) |

(52) U.S. Cl.
CPC .............. *G05D 19/02* (2013.01); *A43B 3/0005* (2013.01); *A43B 5/0415* (2013.01); *A63C 5/06* (2013.01); *A63C 9/00* (2013.01); *A63C 2203/18* (2013.01); *A63C 2203/22* (2013.01)

(58) Field of Classification Search
CPC .. A63C 9/00; A63C 2203/22; A63C 2203/18; A43B 5/0415; A43B 3/0005; G06F 19/3481; G05D 19/02

USPC ............... 702/72, 19, 44, 160, 182, 141, 142, 702/149, 187, 188; 422/101, 72, 63; 436/43
See application file for complete search history.

(56) References Cited

U.S. PATENT DOCUMENTS

| | | | | |
|---|---|---|---|---|
| 5,524,637 | A * | 6/1996 | Erickson | 600/592 |
| 5,862,803 | A * | 1/1999 | Besson et al. | 600/508 |
| 6,498,994 | B2 * | 12/2002 | Vock et al. | 702/44 |
| 6,885,971 | B2 * | 4/2005 | Vock et al. | 702/182 |
| 6,959,259 | B2 * | 10/2005 | Vock et al. | 702/142 |
| 7,054,784 | B2 * | 5/2006 | Flentov et al. | 702/149 |
| 7,072,789 | B2 * | 7/2006 | Vock et al. | 702/141 |
| 7,092,846 | B2 * | 8/2006 | Vock et al. | 702/182 |
| 7,200,517 | B2 * | 4/2007 | Darley et al. | 702/160 |
| 8,239,146 | B2 * | 8/2012 | Vock et al. | 702/44 |
| 2003/0163287 | A1 * | 8/2003 | Vock et al. | 702/187 |
| 2006/0015287 | A1 * | 1/2006 | Vock et al. | 702/141 |

(Continued)

*Primary Examiner* — Carol S Tsai

(57) ABSTRACT

A method and apparatus for controlling of ski vibration consisting an accelerator/actuator sub-system attached to the ski and a adaptive vibration control application residing in the user smart-phone and communicating with the accelerometer/actuator sub-system over Bluetooth radio interface is disclosed. The adaptive vibration control application extracts vibration frequencies and amplitudes from signal received from an accelerometer, separates such frequencies according to their types—bending or torsional, and after thresholding and scaling by the ski calibration parameters and by the user desired ski response, apply such signal to the control loop and consequently to the actuators to provide vibration dampening force. In one embodiment, such actuators are attached to the ski, while in another embodiment such actuators are embedded into the ski.

20 Claims, 11 Drawing Sheets

Actuator Sub-system - Planar View

(56) References Cited

U.S. PATENT DOCUMENTS

2006/0235642 A1* 10/2006 Vock et al. .................... 702/141
2007/0144842 A1*  6/2007 Zhou ............................. 188/267
2013/0218053 A1*  8/2013 Kaiser et al. ................. 600/595

\* cited by examiner

Section A - A

Actuator Sub-system - Planar View

ADAPTIVE VIBRATION CONTROL FOR SKI

PRIORITY INFORMATION

This application is Continuation In Part application of non-provisional application Ser. No. 13/024,070 titled "Wireless System for Monitoring and Analysis of Skiing" filed on Feb. 9, 2011, which claims benefit of priority under the 35 U.S.C. section 119 of a Provisional Application No. 61/310,584 titled "Wireless System for Monitoring and Analysis of Skiing" filed Mar. 4, 2010, which are hereby incorporated by reference in its entirety as though fully and completely set forth herein.

FIELD OF THE INVENTION

The present invention relates to the field of canceling vibration in snow skis, snow boards, and specifically to the monitoring of ski or snowboard bending forces, estimating such forces resonance frequencies and amplitudes, calculating an inverse matrix of such vibration forces and applying a corrective stimulus to the MEMS (Micro-Electromechanical System) actuators embedded in the ski or snowboard equipment. The effect of such corrective stimulus may change the tension or stiffness in the core of the ski, or to apply pressure to the ski edge to aid in edge to change its shape and/or length, or to change torque in a selected parts of the ski to improve ski or snowboard handling on the snow.

BACKGROUND OF THE INVENTION

Ski or snowboard turns when moments are applied to the ski edge by skier body position in relation to ski slope and the skier speed, and the turning performance is determined by the centrifugal force and the reaction to this force introduced by ski-snow contact.

To achieve tight turning radius, the ski sideline edge is curved and ski is made flexible to allow bending during the turn and avoid rolling. To improve the experience of skiing, manufacturers introduced skis with strong sideline curvature—broader tip and tail and narrow center, and high flexibility.

Since such design leads to large vibration amplitudes, manufacturers produce skis with different stiffness factor to balance the needs and experience of broad range of skiing enthusiasts, from beginners to professionals. In effect, soft and highly flexible skis, targeting average expertise levels and/or soft snow have tendencies to vibrate excessively at high speeds or in tight turns or hard or icy snow, while less flexible or stiffer skis, targeted for experts are difficult to control by an average skilled user. However, all skis, regardless of their design parameters will vibrate in turns does loosing the edge contact with the snow making edge control difficult and increases discomfort and decreases safety and performance.

Depending on the speed and snow condition, ski vibrates at several bending and torsional frequencies with the amplitudes of such vibration dependent on ski construction—stiff and hard ski may have lower amplitudes at some frequencies but are difficult to control by an average user, while soft ski may be easy to control but have higher vibration amplitudes. In general, the ski bending frequencies are between 10 Hz and 100 Hz, while the torsional frequencies are in the range of 100 Hz to 150 Hz.

For several decades designers try different materials, manufacturing techniques and vibration damping schemes to somehow minimize its negative effect. As the ski vibrates predominantly at the front and the tail quarters of its length, various damping materials and structures were added to the front, tip and tail of the ski.

However, adding large amount of damping does not solve this problem while making ski less responsive and slow. It is well know that ski vibrates over relatively wide range of frequencies, and while dampening materials or dampening viscous structures are effective to damp particular frequency, such structures are not efficient in damping wide range of frequencies, and sometime even counterproductive. Ceramic piezoelectric structures were proposed to provide active dampeners, however, since only small amount of strain—as low as 1%, is usable to provide the control signal, they proved to be difficult to control and unstable or require "pre-tension" of the piezoelectric material in proportion to the expected bending forces in order to produce reference signal, and as such not compatible with ski manufacturing technologies.

Today smart-phones besides providing basic communication over cellular network is equipped with various input/output capabilities, such as wireless PAN (Personal Area Network), and provides significant computing resources. When such computing resources communicate with the remote sensors, such as MEMS accelerometers, magnetometers, gyroscopes, pressure sensors and actuators, the resulting system can provide various sport analytical tools for adaptive vibration control system for ski and snowboards.

By coupling MEMS accelerometers and thermo-electric actuators embedded in the ski equipment with a vibration analysis application residing in the user smart-phone, one can provide adaptive vibration control system for ski. Furthermore, using the smart-phone connectivity to the wireless cellular network, a real-time feedback to the predefined remote location may be provided, adding benefits in ski testing or training. The adaptive vibration control system described in this invention can operate using any of wireless technology such as: cdma2000, UMTS, WiMax, LTE. LTE-A, etc.

SUMMARY OF THE INVENTION

This invention allows for an adaptive ski and snowboards vibration control system by providing analysis of ski vibration frequencies, calculate an inverse of such vibration frequencies and apply the resulting correction stimulus signal to the thermo-mechanical MEMS actuator structure embedded in the ski core or attached to the ski top surface.

The system consists of an accelerometer sensor embedded in the ski to provide measurements of instantaneous changes of acceleration in x/y/z axis; a wireless interface such as Bluetooth or another Personal Area Network (PAN) wireless interface; a smart-phone based application providing analysis of the signals received from the accelerometer allowing estimation of ski vibration frequencies and their amplitudes through the use of Discrete Fourier Transform (DFT) analysis, classification of the fundamental bending frequencies and their amplitudes, selecting the bending frequencies which amplitudes exceeds predefined threshold and calculating the inverse matrix of each bending frequency, then adding such matrices to provide composite matrices which after processing by Inverse Discrete Fourier Transform (IDFT) produces control signal correcting ski vibration. This signal is scaled by the ski design and calibration parameters and the user parameters, and together with the feedback signal processed by the $2^{nd}$ order control loop or Least Mean Squared (LMS) algorithm before being transmitted over the PAN wireless interface to the thermo-electrical actuator embedded in the ski core to damp vibration. The control signal stimulates the thermo-electrical actuators, which in response extracts/contracts at the rate and in proportion to the control signal, providing dampening force proportional to the vibration but inverted in polarity.

BRIEF DESCRIPTION OF THE DRAWINGS

A better understanding of the present invention can be obtained when the following detailed description of the preferred embodiment is considered in conjunction with the following drawings, in which:

FIG. 38B is a time domain representation of ski vibration measured during a typical run;

Figure 1:
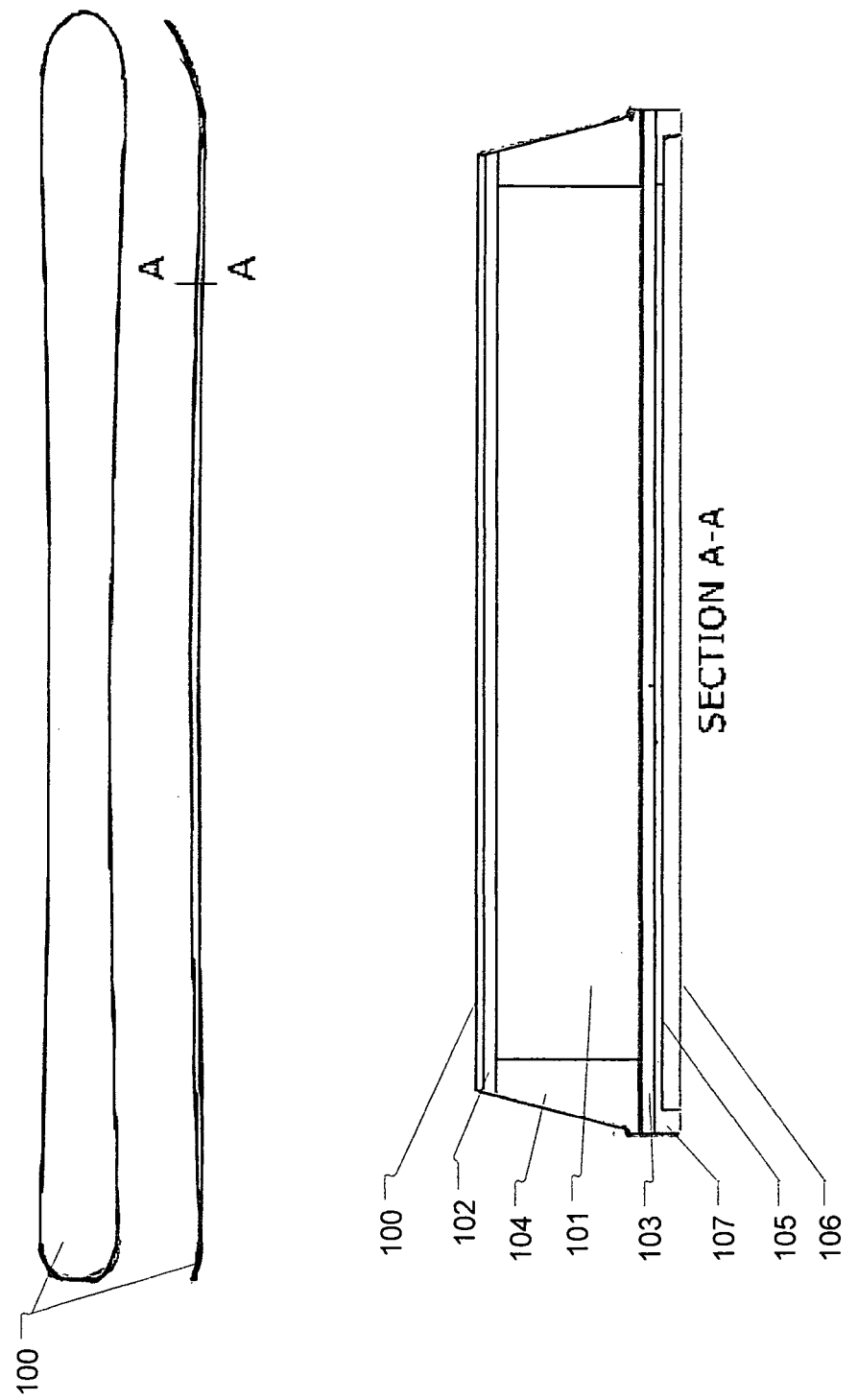
FIG. 1 presents top, side and a cross section views of a typical ski, prior to the current invention

While the invention is susceptible to various modifications and alternative forms, specific embodiments thereof are shown by way of example in the drawings and are herein described in detail. It should be understood, however, that the drawings and detailed description therefore are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor which connects to the first processor over a network, such as wireless PAN or WMAN network or the Internet. In the latter instance, the second processor may provide program instructions to the first processor for execution. The term "memory medium" may include two or more memory medium residing in different locations, e.g., in different processors that are connected over a network.

Adaptive Vibration Control System—in the context of this invention a system able to collect various instantaneous vectors such as, acceleration, angular orientation, etc., then using various mathematical operations calculates resonance frequencies of vibrating ski then sends commands to actuators embedded in the sport equipment to provide corrective action.

Application—the term "application" is intended to have the full breadth of its ordinary meaning. The term "application" includes 1) a software program which may be stored in a memory and is executable by a processor or 2) a hardware configuration program useable for configuring a programmable hardware element.

Computer System—any of various types of computing or processing systems, including mobile terminal, personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Terminal—in the scope of this invention any wireless enabled terminal such as cell-phone, smart-phone, etc.

NFC—in the scope of this invention a type of radio interface for near communication.

PAN—in the scope of this invention, a personal are network radio interface such as: Bluetooth, ZigBee, Body Area Network, etc.

User—in the context of this invention, person using the adaptive vibration control system.

Ski Equipment—in the context of this invention, any part of equipment used by the skier, such as: skis, snowboard, ski boots, etc.

Ski Equipment Parameters—in the context of this invention, ski or snowboard design and manufacturing parameters, such as: length, weight, toe/center/tail, stiffness, etc. are extracted after manufacturing and entered into application.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Visual C, Java, assembly language, etc.; graphical programs (programs written in graphical programming languages); assembly language programs; programs that have been compiled to machine language; scripts; and other types of executable software. A software program may comprise two or more software programs that interoperate in some manner.

QR-code—Quick Response Code, a 2-D bar code

WMAN—Wireless Metropolitan Access Network such as cellular network.

DESCRIPTION OF PREFERRED EMBODIMENT

The proposed method leverages on the properties of wireless Personal Area Network (PAN) such as Bluetooth, sensing technology such as: MEMS accelerometers, gyroscopes, magnetometers, actuators, embedded into ski equipment, and an application software residing in the user wireless terminal (for example user smart-phone).

In this invention sensor technology embedded in various places of the user ski equipment, provides instantaneous measurements of vibration of the ski or snow-board and transmits such measurement to the mobile terminal based application over the PAN wireless interface which perform analysis and generates signal to the actuators embedded in the ski to cancel vibration. This process is performed continuously in a close control loop does providing adaptive vibration control.

The preferred embodiment of the Adaptive Vibration Control System of this inventions consist of: a Actuator Sub-system embedded or attached to the ski and located at approximately ½ of the distance between the tip of the ski boot and the place the front of the ski still maintains the contact with the snow. Such Actuator Sub-system consist of at least one accelerometer capable of measuring instantaneous acceleration in X/Y/Z axis, four MEMS—preferably thermo-electrical or torsional actuators capable to provide displacement and force necessary to react to the bending or torsional forces and frequencies, and a low-power Bluetooth radio interface. In addition, such Active Vibration Control System consist of an application residing in the user smart-phone memory, which application is capable of receiving the signals from the Actuator Sub-system actuator(s), estimating the vibration frequencies and amplitudes, generating and inverse of such vibration amplitudes and in continuous control loop control transmit cancellation signal to the Actuator Sub-system actuators over smart-phone Bluetooth radio interface.

Exemplary ski 100 of the prior art and it's cross-section 101 is presented in FIG. 1, which illustrate the shape and construction of the ski, intended to be structurally strong but flexible and easy to turn. To achieve such functionality, the ski is shaped to have wider front (or shovel) portion, narrowed and raised central portion and wider tail. To satisfy strength and flexibility requirements, ski is manufactured form various materials sandwiched together. The construction and materials of such exemplary ski is presented in cross section A-A of FIG. 1.

The core 101, is a central portion of the ski which main function is to provide strength and flexibility and usually made of wood, such as poplar, ash, etc. or honeycomb metal or structural foam. Such core is encapsulated between top 102, and bottom 103 composite layers made of materials such as glass, carbon or carbon-kevlar fibers and ABS sidewalls 104. For a very stiff ski, for example race skis, the composite layers 102 and 103, may be augmented with high tensile strength aluminum alloy layer such as titanal. A layer of fiberglass 105 is added between the lower composite "wrap" of core and the base 106, which provides low resistance sliding on the snow and may be made of sintered polyethylene. The carbon steel edge 107, function is to provide 'grip' to the snow during turns. The main objective of such "sandwich" construction is to provide ski with necessary stiffness while preserving flexibility does allowing easy turns in all snow conditions. Those skilled in art will recognize that the present invention is not limited to the above described ski construction, but may as well be used in other type of skis, such as "cap" or "semi-cap" construction.

Figure 2A:
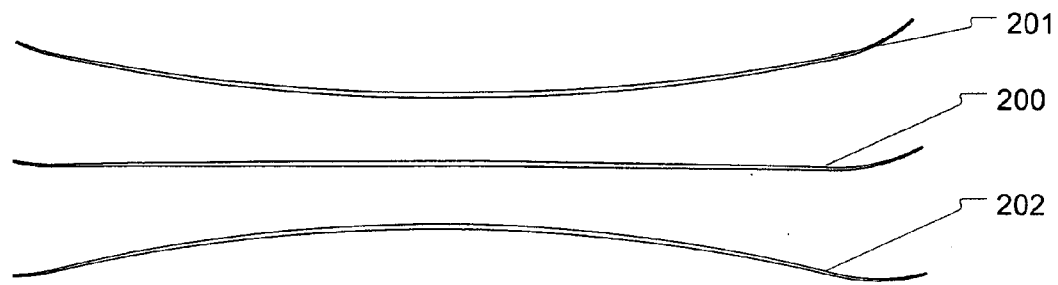
FIG. 2A presents the views of natural-ski bending of the ski.

FIG. 2A presents the natural bending modes 200, 201 and 202, when the ski adapts to the snow conditions. Such bending depends on ski design parameters and intended to provide continuous contact with the snow. As such a stiff or racing skis will bend less and will be harder to turn while soft, recreational skis will be more flexible. As such natural bending of the ski is designed to aid in turns, the rate at which the ski bends in such mode is relatively low and in general below 1-2 Hz. Furthermore, when such natural bending will be dampened quickly by the parameters of materials used in ski construction. The time domain response of such natural bending vibration of the ski is presented in FIG. 2B, where the vibration amplitude exponential decay function $Xe_n^{-\varsigma \omega t}$, 203. The rate of the decay depends on ski construction and is denominated by the damping parameter $\varsigma$, 204. As the damping parameter $\varsigma$, goes toward unity, the dampening effect is larger as illustrated on FIG. 2C.

When traveling at higher speeds over hard and/or uneven snow, ski starts to vibrate at several harmonic frequencies, and while the ski traverses from one turn to another, or from one type of ski/snow interface conditions to another, the amplitudes of the bending frequencies may change before it's amplitude decays. When vibration frequency, or their harmonics are similar, or the phase of the amplitudes are equal, such amplitudes will add producing even larger vibrations. The effect of such bending vibration on the ski and it's gliding capability and the induced vibrations in time and frequency domains are presented in FIGS. 3A, 3B and 3C. Such vibrations are mostly pronounced in the tip section of the ski at approximately ½ of the length between the foremost point of ski contact with the snow and the tip of the ski boot, or generally in the area where the ski cross-section is smallest.

Figure 3A:
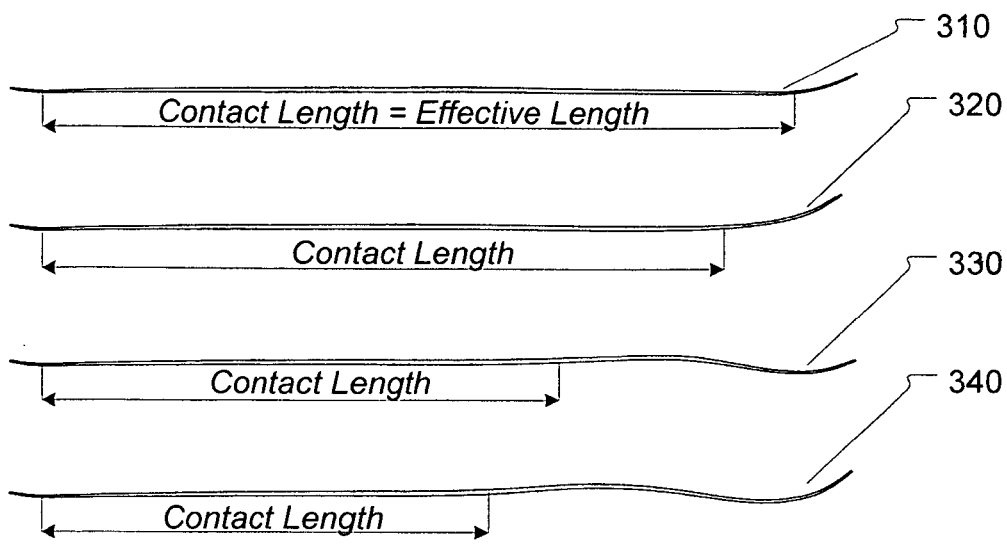
FIG. 3A presents the ski bending due to vibration.
Figure 3B:
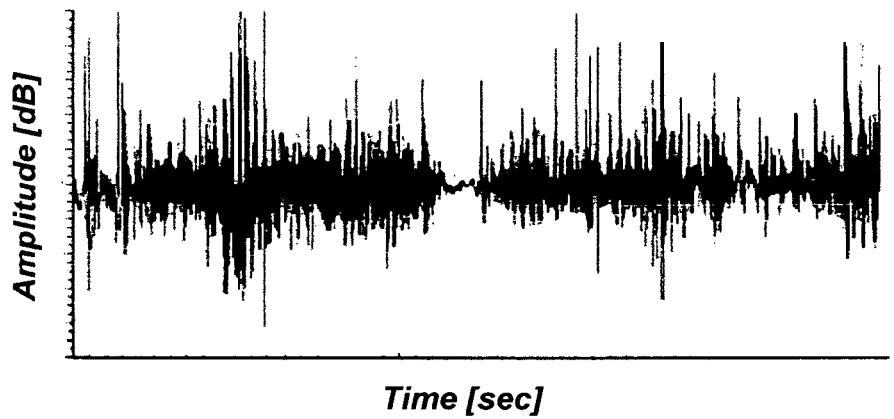
FIG. 3C presents power spectral density (PSD) of the vibration presented in FIG. 3B after frequency domain analysis.
Figure 3C:
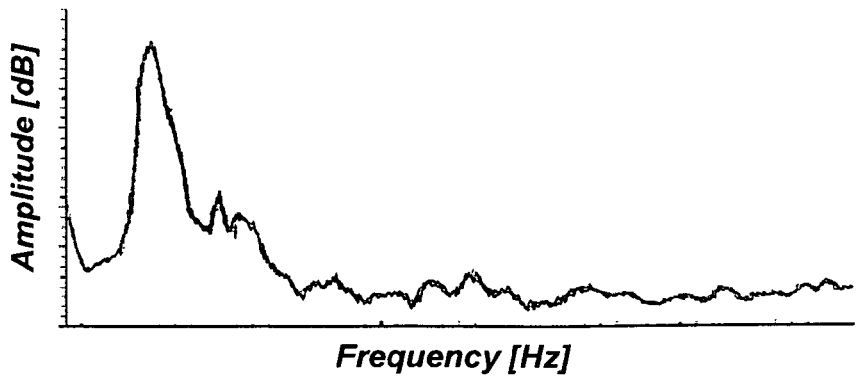

As seen in FIG. 3A, vibration free ski 310, maintains contact with the snow along it's full effective length. However, when the vibration induced bending force lifts the tip of the ski upwards 320, the entire front portion of the ski looses contact with the snow, making sharp turn ineffective or even impossible. When the natural ski flexibility reacts to such bending force, ski will flex in the opposite direction 330, at which period front of the ski obtains contact with the snow while part between the front and center will loose such contact. In addition of having similar effect on efficiency of the turn as bending 320, such moment transfers vibration energy to the center of the ski and to skier legs/body, does producing discomfort, making next turn more difficult. In some condition, ski vibration may cause the ski to bend in a shape of wave 340, and hard to control even by very experienced individual. FIG. 3B, presents time domain waveform of such destructive vibration, as FIG. 3C, presents the power density function of such vibration, from which we can see the vibration power (amplitude) is concentrated at approximately 22 Hz.

Figure 4:
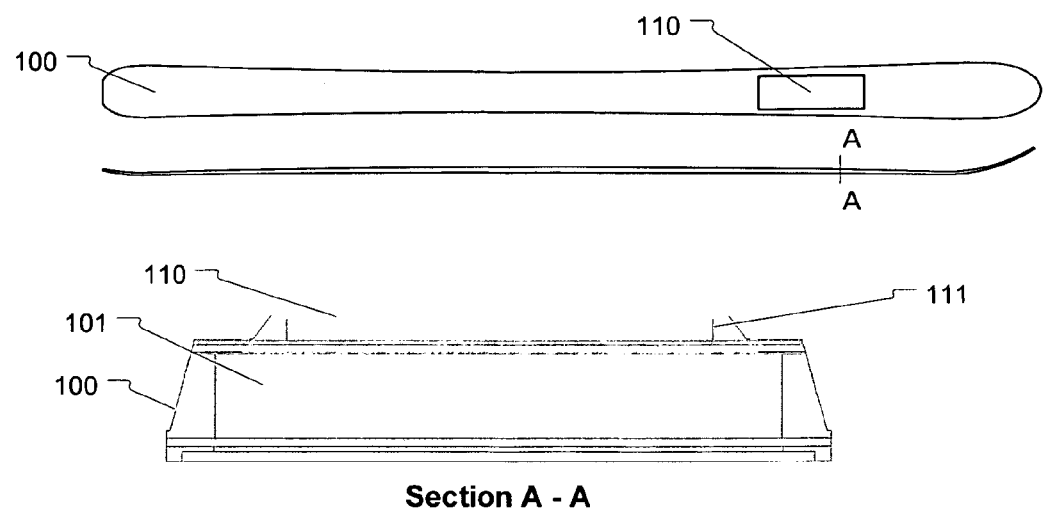
FIG. 4 presents a top, side and the A-A cross-section of an exemplary ski with the planar view of an actuator sub-system attached to the top surface of the ski.
Figure 4:
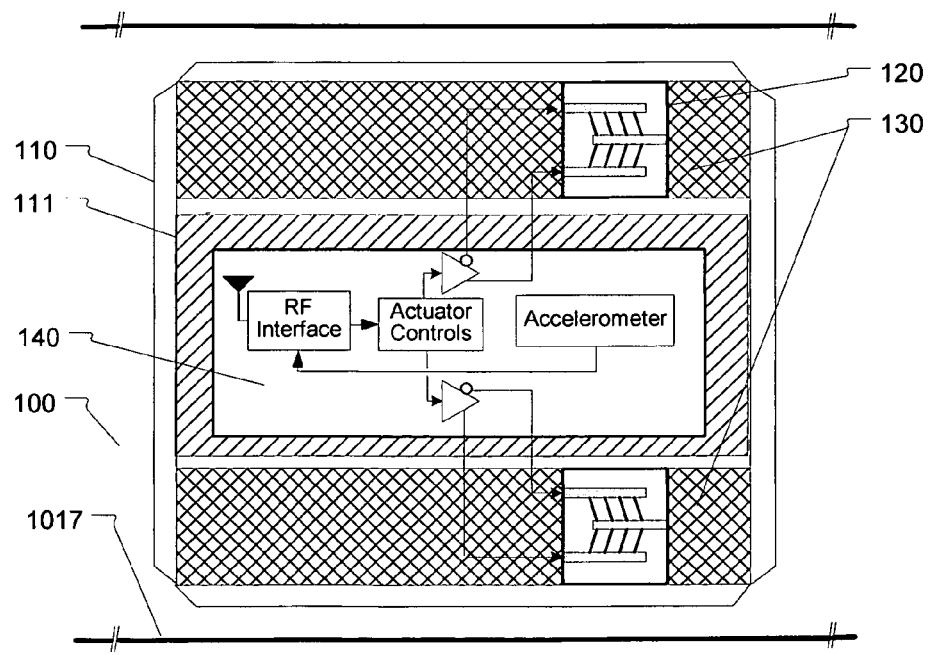
Figure 5:
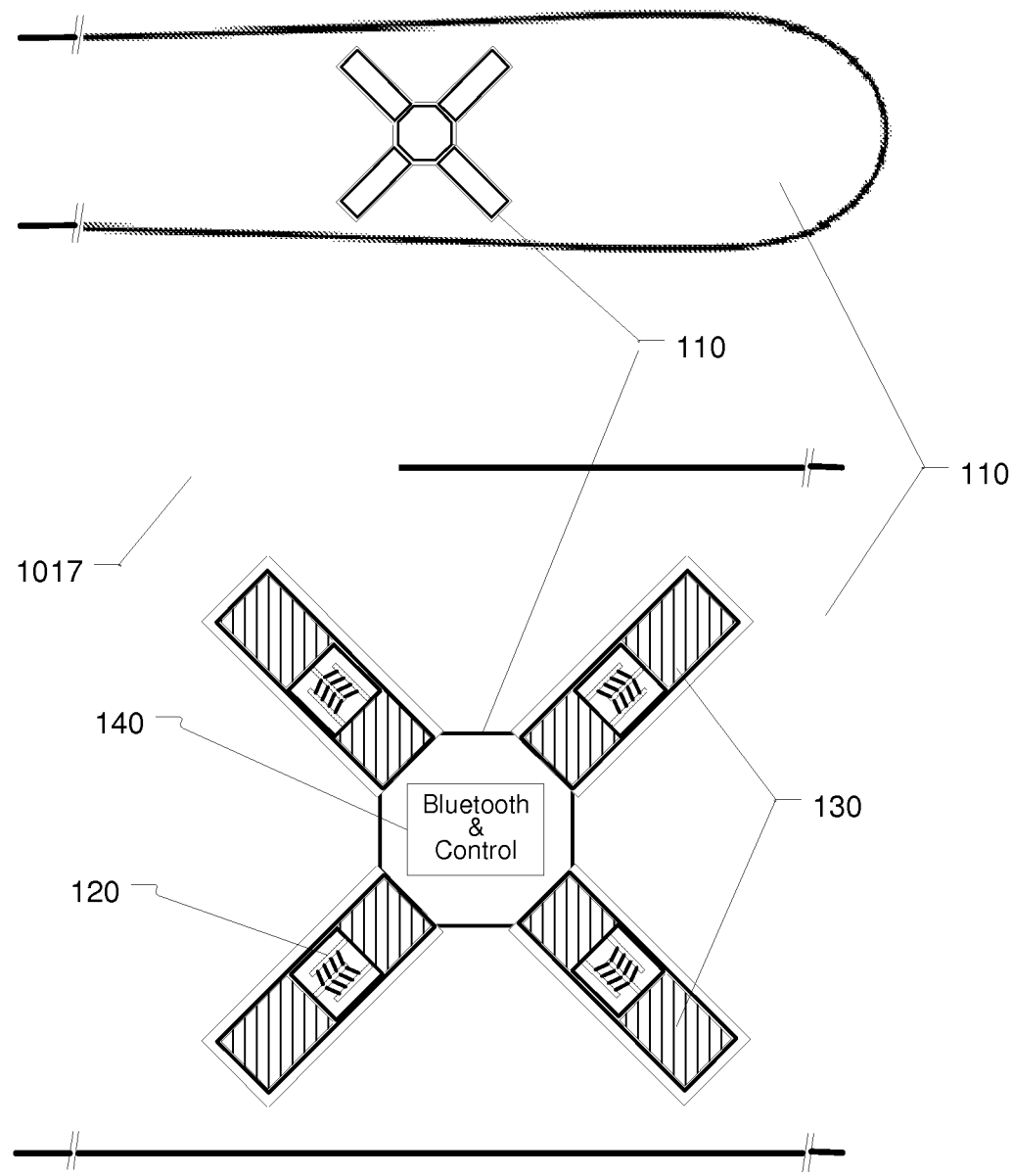
FIG. 5 presents a view of an exemplary actuator sub-system attached to the top surface of the ski according to another embodiment of this invention.

Vibration induced bending and torsional forces may be controlled and canceled entirely using Adaptive Vibration Control system presented in FIGS. 4 through 11 and described below in details. FIG. 4 presents the ski 100, with the attached Active Vibration Control system actuator sub-system 110 according to the preferred embodiment, an A-A cross-section of said ski and the actuator sub-system, and a planar view of the actuator sub-system components. The actuator sub-system 110 is hermetically encapsulated in the carbon-kevlar composite structure 111, and consists of actuators enclosure containing, preferably thermo-electric MEMS actuators 120. Such thermo-electric MEMS actuators are compatible with ski manufacturing processes, extremely reliable and provide large forces and displacements, when stacked together. Displacement cores 130, transfer the moment produced by the expansion/contraction of the actuator to the large area of the ski. In addition, such actuator sub-system consists of control logic 140, containing accelerometer(s), actuators control and a Bluetooth radio interface.

Figure 6:
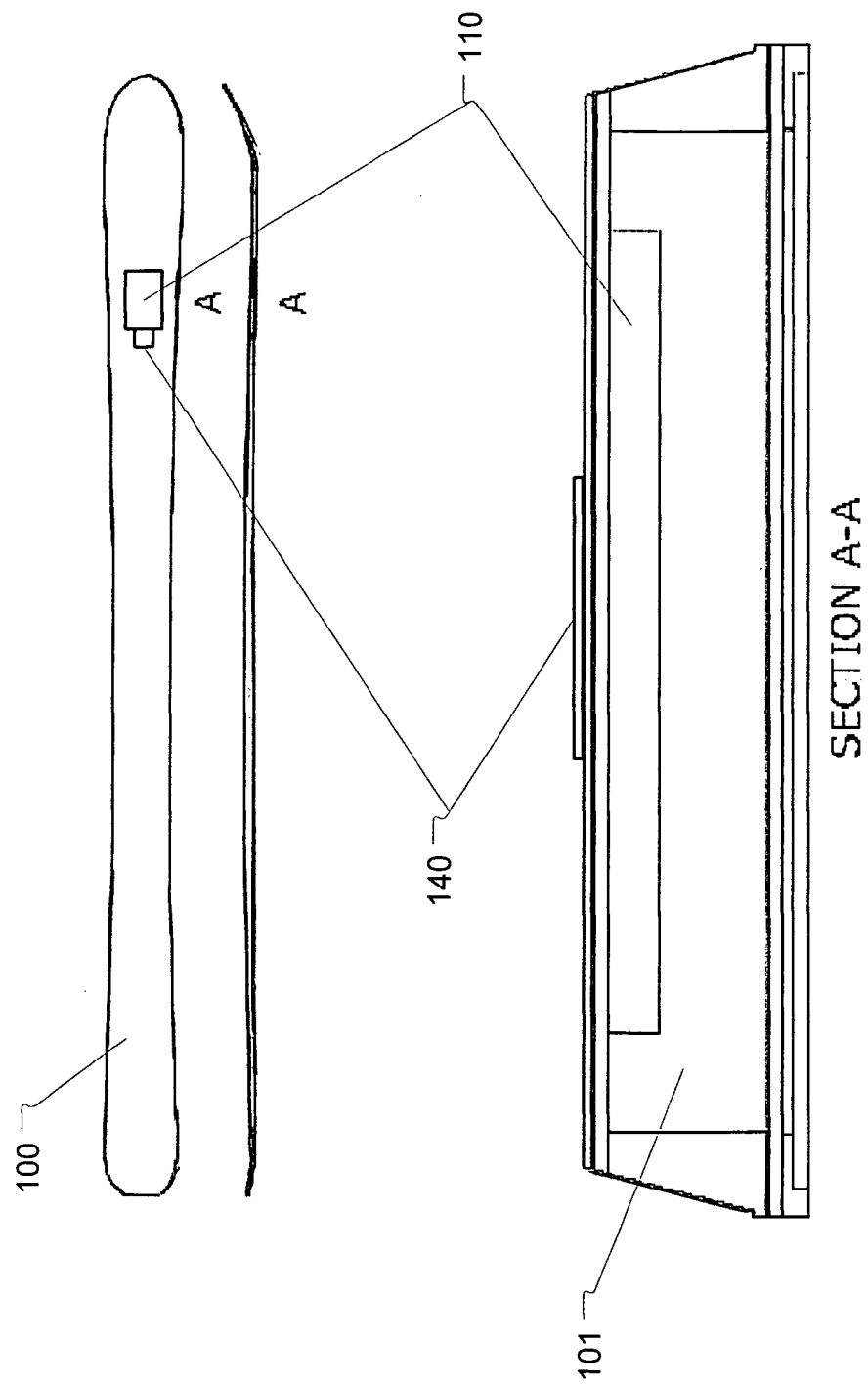
FIG. 6 presents top, side and the A-A cross sections views of an exemplary ski with the actuator sub-system embedded into the ski core.

It must be noted that location, orientation, number of actuators and their dimensions may differ from the exemplary structure presented in FIG. 4, in order to provide optimum vibration control for different type of skis. An example of such differently designed actuator sub-system is presented in FIG. 5, while FIG. 6 presents yet another embodiment of the Active Vibration Control system in which the actuator sub-system 110, is integrated into the core of the ski while the control and PAN radio interface are encapsulated and attached to the top surface of the ski.

Figure 7:
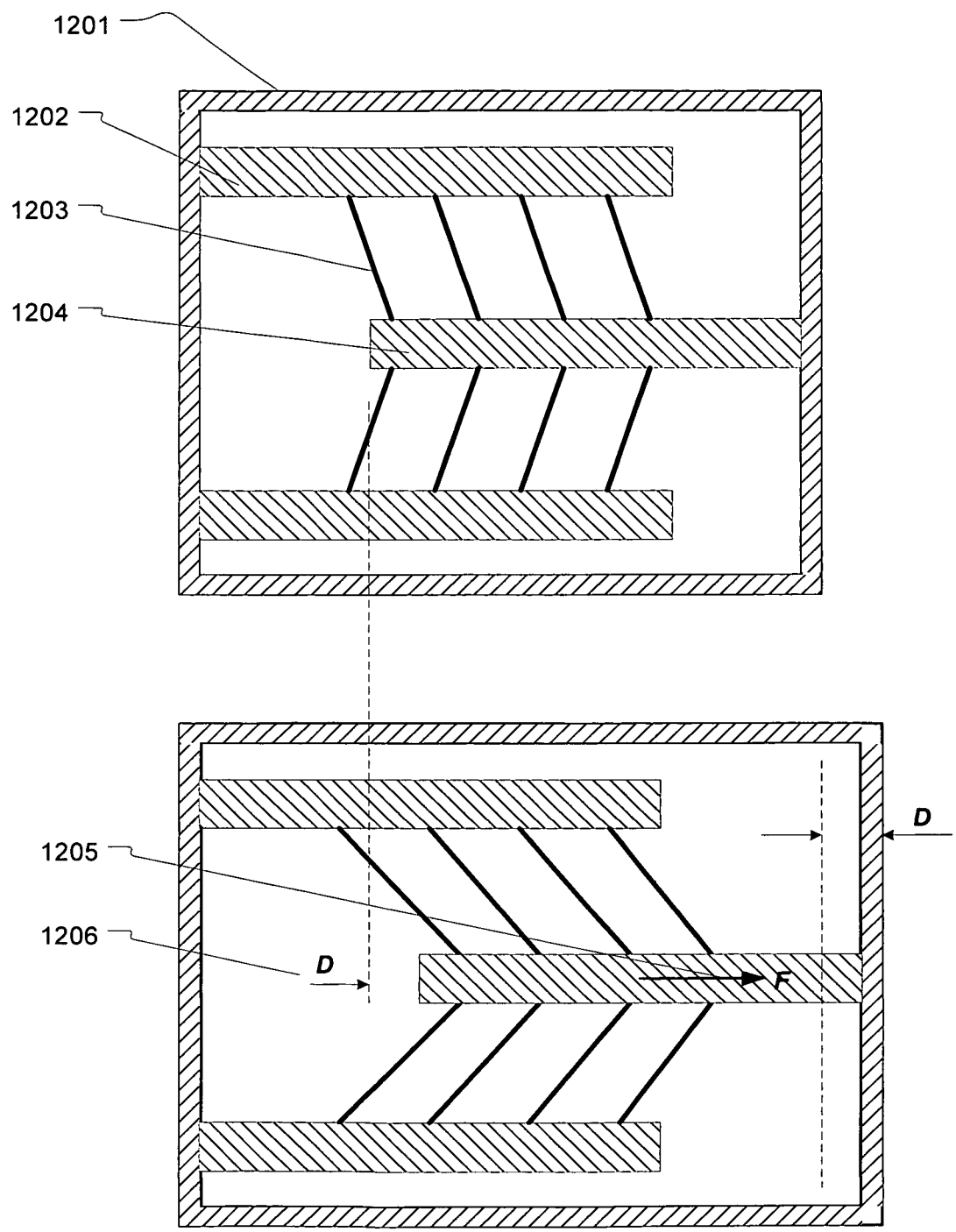
FIG. 7, presents a view of the thermo-electrical MEMS actuator before application of the damping signal (top view), and after damping signal causing extension of the actuator is applied (bottom view)

The robust, chevron stale (bent-beam) thermo-electric MEMS actuator 120 offering large design and fabrication flexibility is presented in FIG. 7. The desired performance (force), displacement distance, etc. can be achieved by stacking an appropriate number of V shaped "legs" and selecting "leg" length, cross-section area, and offset. Actuator enclosure 1201 is constructed in such a way that the side walls of the enclosure allow for some expansion, for example 1-2 mm, while the front and rear sides of the enclosure are from a rigid material, such as aluminum alloy to transfer the force of the expanding actuator to the displacement cores.

The control signal for such thermo-electrical actuator is applied to the anchor terminal pad 1202, permanently attached to the end wall of the actuator enclosure, heats the beams of the stacked actuators 1203 providing thermal expansion caused through the Joule heating of the beams. Such expansion is transferred into displacement of the movable shuttle 1204. The force 1205 and the distance 1206, the movable shuttle is displaced due to the heating effect is proportional to the current and grows with the number of stacked actuator beams.

Figure 8:
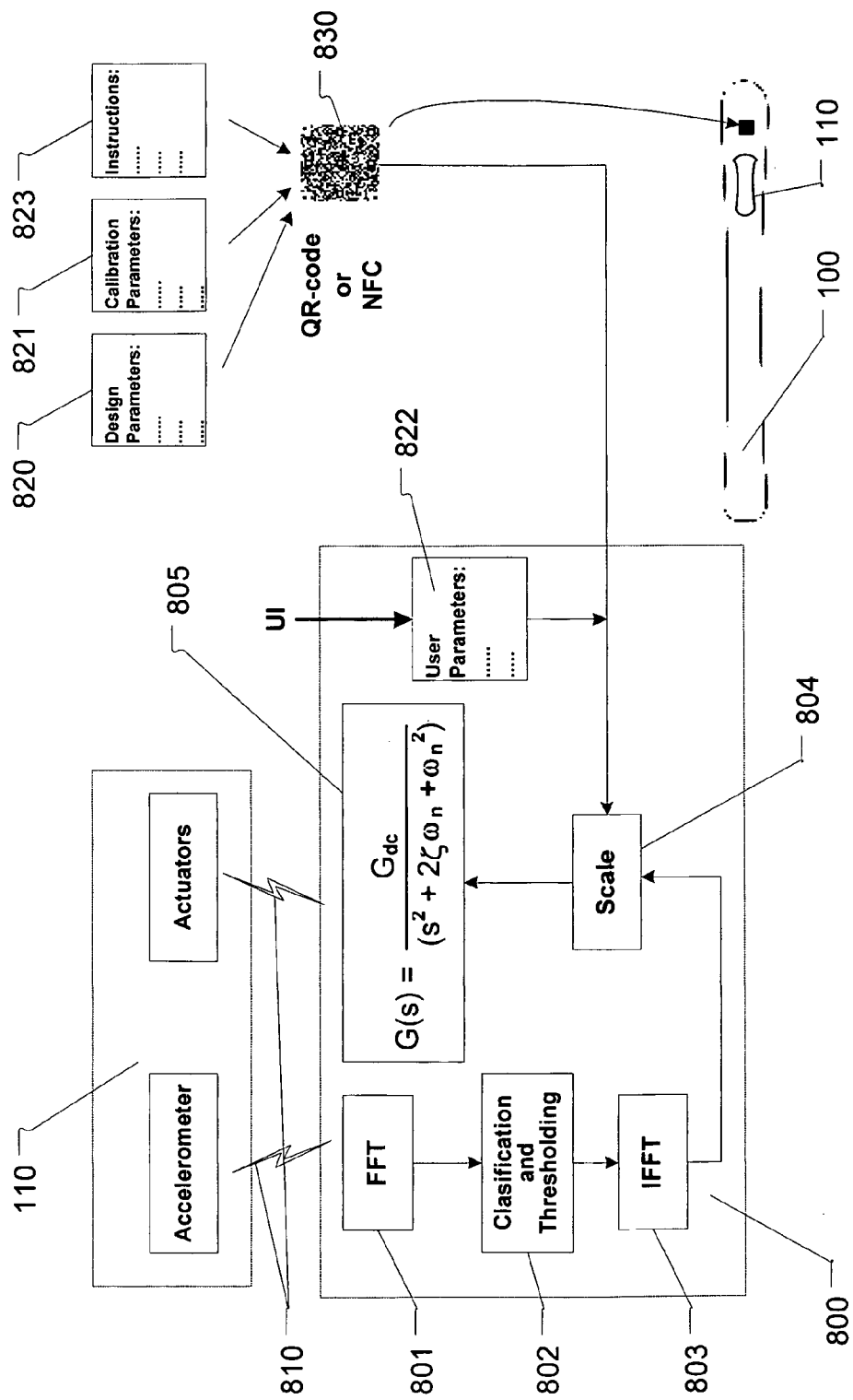
FIG. 8 illustrates the functionality of the Adaptive Vibration Control system.

An example of such system is presented in FIG. 8. Here actuator sub-system 110, within ski 100 is in communication with the adaptive vibration control (AVS) application 800 residing in the user smart-phone using PAN wireless interface (such as low power Bluetooth), 810. When active, the AVS application samples the x/y/z vectors of the accelerometer embedded in the actuator sub-system at the rate suitable for determination of ski vibration. The, x[n] sequence of samples represents continuous-time domain function, x[t], at discrete moments in time: t=nT, where T is the sampling interval in seconds, and $f_s=1/T$ is the sampling rate (samples per second).

Such sequence x[n] of length appropriate to satisfy the bandwidth of the vibration frequencies and the desired resolution, expressed as:

$$X_{2\pi}(\omega) = \sum_{n=-\infty}^{\infty} x[n]e^{-i\omega n}.$$

Is presented to the Discrete Fourier Transform (DFT) engine 801, residing within AVS application. Such DFT provides and approximation of the continuous Fourier transform function:

$$X(f) = \int_{-\infty}^{\infty} x(t) \cdot e^{-i2\pi ft} dt.$$

The power spectral density (PSD) of ski vibration is estimated and the results processed by the AVS Classification and Thresholding function 802.

This PSD (frequencies and amplitudes) of ski vibration is first classified in terms of fundamental and harmonic frequencies, which process can be performed using multi-taper spectral estimator utilizing several different orthogonal data tapers, or any other suitable technique well known to those skilled in art. In effect of such classification, all harmonic frequencies, 8021 of the fundamental frequencies within the desirable bandwidth, let say 5 Hz to 200 Hz are discarded. Then the remaining frequencies are classified into three separate categories: natural frequencies 8022; bending frequencies 8023; and torsional frequencies 8024. Then, the bending and the torsional frequencies amplitudes are compared to their respective thresholds: 8025 and 8026. All amplitudes below the respective thresholds are discarded while frequencies and amplitudes for bending frequencies and frequencies and amplitudes for torsional frequencies are added to produce composite matrix of the residual distractive vibration at time $\Sigma X'_f[t]$.

Classification for bending and torsional frequencies is used to distribute the dampening force according to the type of vibration—along the ski logitudal axis for all bending vibration, and along the perpendicular ski axis (or combination of logitudal/perpendicular) axis for the torsional vibrations, while the natural bending frequencies attributed to ski construction materials and intended to provide flexibility and the desired ski response are discarded.

Next, the composite residual vibration matrix is applied to the AVS Inverse Discrete Fourier Transform (IDFT), function 803, to produce time domain representation of the residual vibration signal. Such signal, is normalized in function 804, before it's applied to the $2^{nd}$ order control function 805, of a general form $G(s)=G_{dc}/(s^2+2\zeta\omega_n+\omega_n^2)$, and finally at time t+Loop_Delay as a control signal to the actuators.

Before the time domain representation of the residual vibration signal is presented to the $2^{nd}$ order control loop 805, the vibration response signal from the ski is normalized by the ski specification and calibration parameters as well as the user physical parameters to obtain the desired control ratio $\zeta$. This is achieved by scaling the residual vibration at function $\Sigma X'_f[t]$ by ski design and calibration parameters and the user current set-up of "target ski response" parameter.

The first information 820, contains such information as: ski length, width, weight, deflection to standard loads, etc. The second information 821, contains data obtained during post-manufacturing calibration process of each individual ski, and contains such information as: vibration damping function $Xe^{-\zeta\omega_n t}$. The third information 822, contains user physical characteristic with such information as: user weight, height, expertise level, etc. In addition, the third information may contain current "target" ski response characteristics, such as: current snow conditions—for example, soft, hard, icy, etc.; desired ski response—for example soft, stiff, etc. as well as the user contact list, which may contain emergency contacts—used by the application to send SMS messages in case of detected emergency, and/or list of IP destination to which ski response data may be send.

Such information is entered into the AVC application when the user associates his/her smart-phone with the ski he/she desires to use by scanning of the QR-code or NFC tag attached to the ski. In addition to the ski and user related information, a forth information 823, containing precoded messages may be included into the QR-code or NFC tag 830, and attached to the ski 100 830. This information among others may contain: operational instructions, time or event or time triggered messages, event triggered advertisement—for example, after run, on the ski lift, etc. Such precoded information may be in textual or audio/visual form. When AVC application is enabled, user may enter information four using smart-phone user interface (UI).

When the user scans such code or NFC tag, parameters contained within the first, second and third information is stared in the AVC data base and used to calculate final value of damping coefficient ζ, does "tuning" user ski to the current snow conditions or the desired type of run, for example: recreational vs. race. Such functionality is enabled by "scaling" the actuators force (displacement) does effecting the amplitude of response to the bending forces. The effect of such controlled dampening provided by the actuator sub-system is presented in FIGS. 2B and 2C.

As the first information 820 (ski length, width, weight, etc.), is directly obtained from the ski design parameters—such as ski type, materials, etc., the second information 821, is obtained during ski post-manufacturing calibration process. Such calibration is necessary as the exact characteristics of each individual ski (flexibility, displacement due to bending forces, resonance vibration, etc.) are unknown a priori.

Figure 2B:
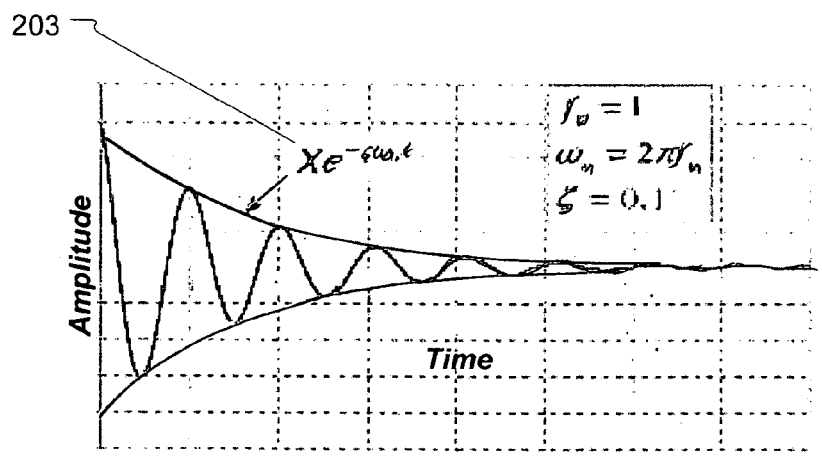
FIG. 2B is a time domain representation of vibration of the "soft" ski.
Figure 2C:
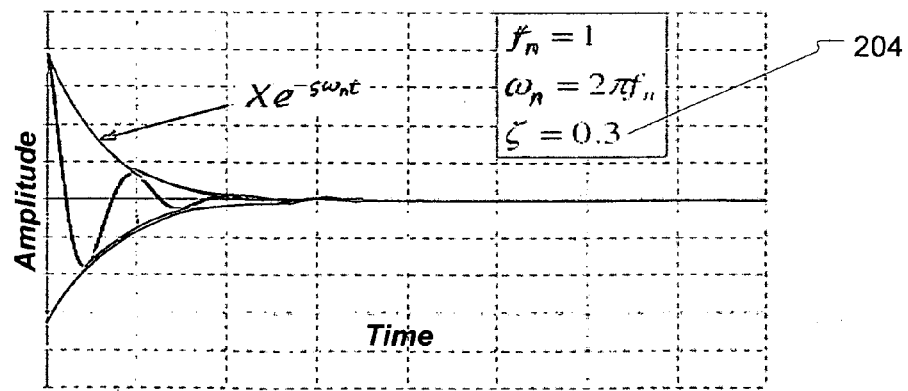
FIG. 2C is a time domain representation of vibration of the "stiff" ski
Figure 10:
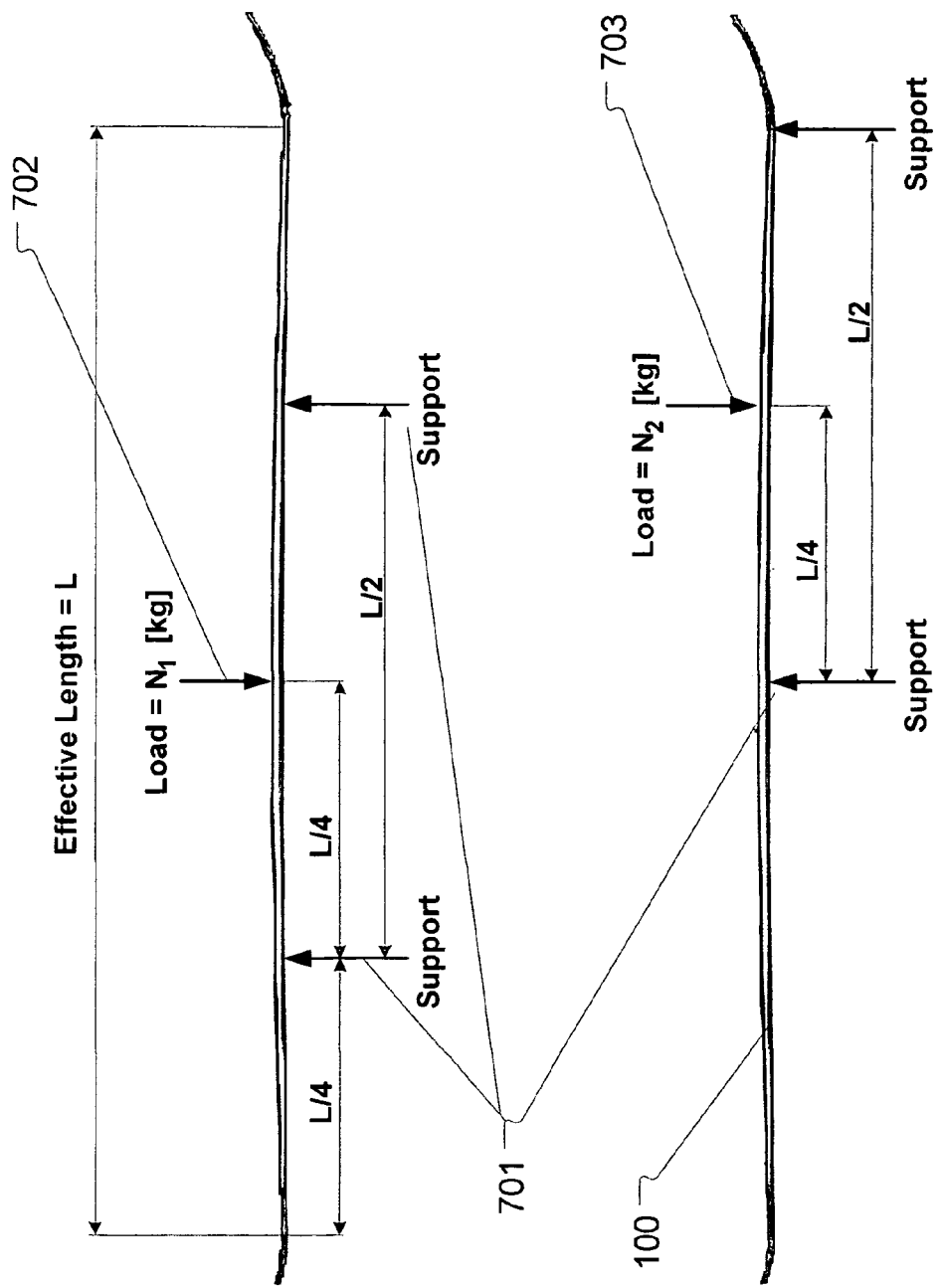
FIG. 10 illustrates an exemplary method to obtain ski calibration parameters.

Such ski calibration process is presented in FIG. 10 and described below in details. During the calibration process, the AVC system is inactive. In Step 1, the deflection of the ski 100, in response to natural bending forces as described in relation to FIG. 2A is measured. Here the ski is placed in the supporting mechanism, which the supports located in the middle points between the center of the ski effective length and the front and rear ends 702, of the ski effective length. Then a load 702, of force $N_k$ is applied to the ½ point of the effective ski length and the displacement of the center of the ski, representing ski flexibility, is recorded and stored in the calibration table. The load value may be changed to obtain more then one result. In Step 2, the load $N_k$ is removed after application and the ski is left to vibrate in response such force, while the decaying function $Xe^{-\varsigma\omega_n t}$, of FIG. 2B, representing natural dampening characteristic of the ski is recorded and stored in the calibration table. Next, the support structure is placed between the center of the ski effective length and the front end of the ski effective length and the procedures described in Step 1 and Step 2 of this process is repeated, at which point, the ski calibration table is populated with the ski flexibility and vibration dampening parameters.

Figure 11:
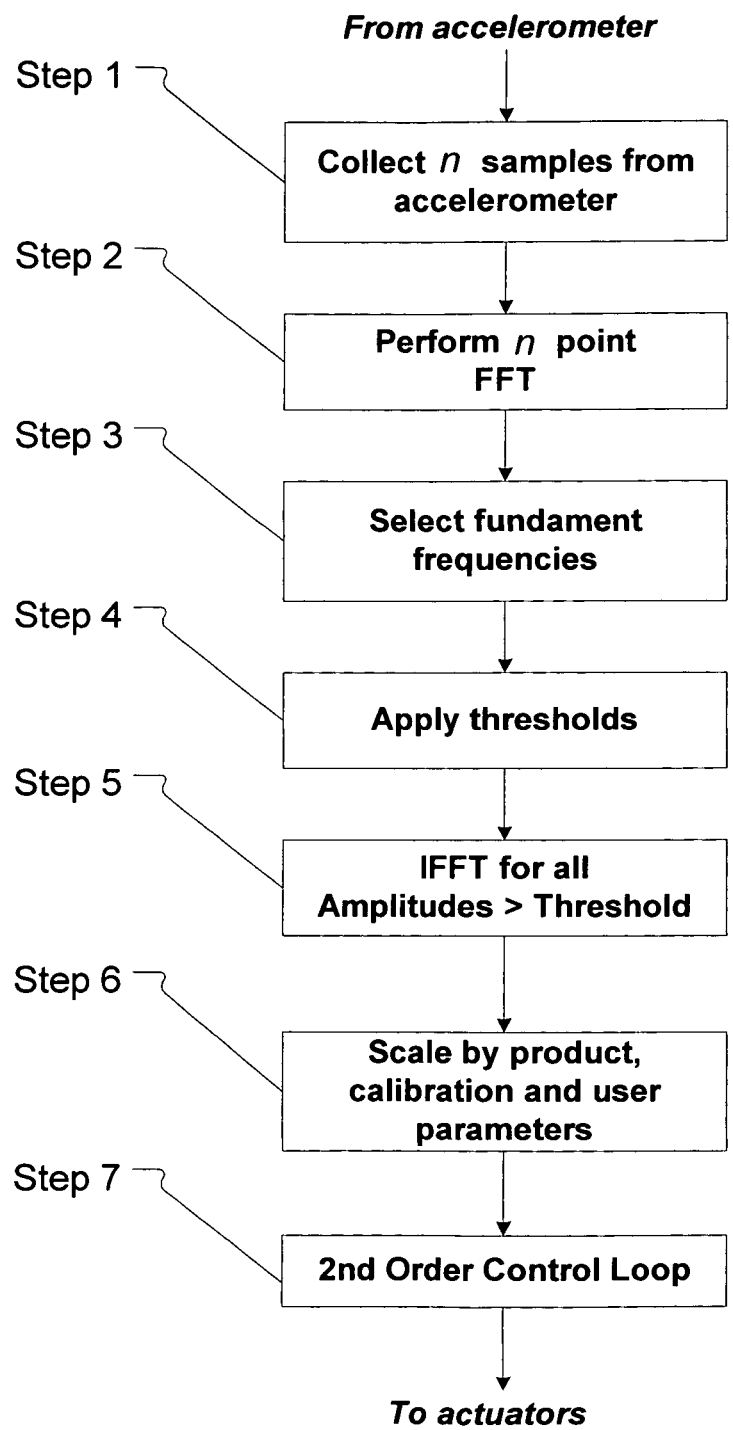
FIG. 11 illustrates the control flow of the Adaptive Vibration Control system.

The operations of the AVC system is presented in FIG. 11. Here in Step 1, n samples of x/y/z coordinates received from the actuator sub-system is accumulated. Then in Step 2, and n point DFT transform $$X(k) = \sum_{n=0}^{N-1} x(u)e^{-j\frac{2\pi kn}{N}} \quad k = 0, 1, \ldots, N-1$$

is performed resulting in approximation of the ski vibrations, represented by the matrix:

$$F = \begin{bmatrix} \omega_N^{0\cdot 0} & \omega_N^{0\cdot 1} & \ldots & \omega_N^{0\cdot(N-1)} \\ \omega_N^{1\cdot 0} & \omega_N^{1\cdot 1} & \ldots & \omega_N^{1\cdot(N-1)} \\ \vdots & \vdots & \ddots & \vdots \\ \omega_N^{(N-1)\cdot 0} & \omega_N^{(N-1)\cdot 1} & \ldots & \omega_N^{(N-1)\cdot(N-1)} \end{bmatrix}$$

where:

$$\omega_N = e^{-2\pi i/N}.$$

Figure 9:
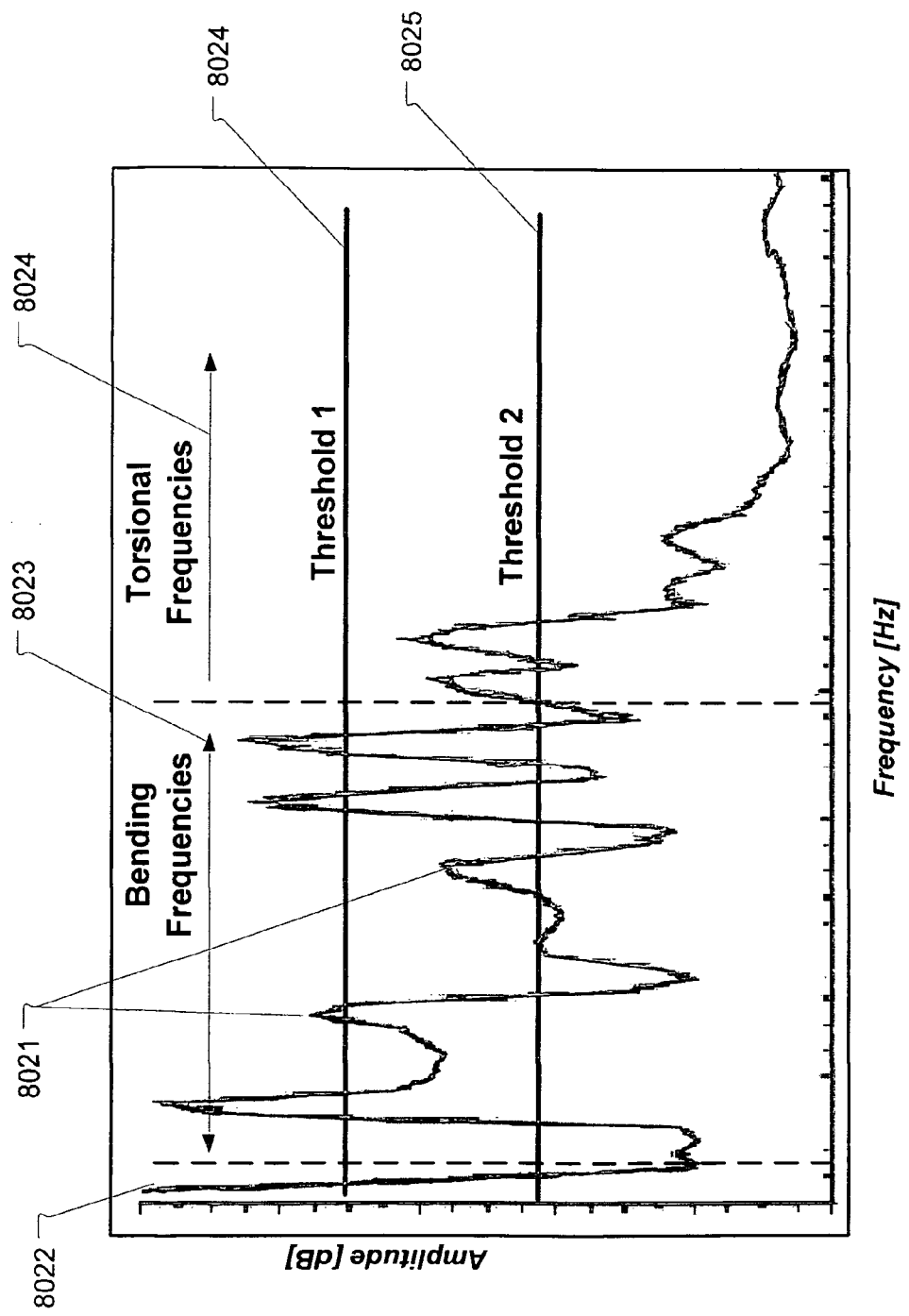
FIG. 9 illustrates analytical thresholds used to classify ski vibration, such as: vibration frequencies and amplitudes, classification and thresholding.

Classification of vibrations as presented in FIG. 9 is performed during Steps 3 and Steps 4. In Step 3, fundamental frequencies all harmonics frequencies 8021 are discarded, while the fundamental frequencies are retained. Then in Step 4, we first separate natural bending frequencies 8022, which are attributed to the ski design parameters and intended to provide desired flexibility and stiffness, from bending frequencies 8023, and torsional frequencies 8024, then apply first threshold 8025, to frequencies in the bending frequency bin 8023 and retains all frequencies with amplitudes above such threshold. Consecutively, second threshold 8026, is applied to frequencies in the torsional frequency bin 8024, and frequencies with amplitudes above such threshold are retained while those below discarded.

Such classification and selection of the frequencies is necessary for several reasons. First, bending vibrations, which occur at a lower frequency range and cause ski to vibrate along it's logitudal axis, have higher amplitude, while the torsional frequencies, also with lower amplitudes, are more destructive as they cause side-to-side vibration of the ski. Second, application of dampening stimulus to the fundamental vibration frequency, also effects harmonics of this frequency. Third, selecting an appropriate threshold levels, increases system performance by making it more resilient to the noise, while lowering the processing requirements and power consumption. Additionally, while attenuating only vibration above such thresholds we make the skiing more comfortable without degradation of enjoyment given by "feeling" of the interaction between ski and snow. And forth, if the actuator configuration allows, for example as in the embodiment of FIG. 5, by applying control signal to certain actuators or at the certain order, one may attenuate both types of vibrations independently.

In Step 5, the resulting matrix is applied to the Inverse Discreet Transform (IDFT), does producing time domain representation of the residual ski vibration signal. Such inverse transform can be obtained by inverting the resulting matrix $$F^{-1} = \frac{1}{N}F^*.$$

In Step 6, the signal representing frequencies and amplitudes of vibrations selected for dampening, is normalized (scaled), by the calibration parameters 821, and by the user parameters 822, to produce the desired control ration coefficient ζ. This may be achieved by employing one of the suitable techniques well known to those skilled in art, such as: Least-Squares Estimation, Discrete Optimal Estimation, or by simple scaling the measured response signal by the "reference" reference signal derived from calibration parameters and user set-point parameters. The coefficient ζ controls the gain of damping function $Xe^{-\varsigma\omega_n t}$.

In Step 7, control signal $G(s)=G_{dc}/(s^2+2\zeta\omega_n+\omega_n^2)$, is generated and send to the actuator sub-system over the smart-phone Bluetooth radio interface.

It has to be noted that step 6 and step 7 may be implemented as a well known PID (Proportional-Integral-Derivative), controller of the form:

$$u(t) = MV(t) = K_p e(t) + K_i \int_0^t e(\tau)d\tau + K_d \frac{d}{dt}e(t)$$

Such controller may be implements in an appropriate to the particular smart-phone programming language, such as: C, C++, or Java. An exemplary C code of a PID controller follows:

```
/* memories */
float S = 0.0, J = 0.0;
void dispid cycle ( ){
    float I,O;
    float J,1,S,1;
    I = Input( );
    J__1 = I;
    S__1 = S + 0.1 * I * 4;
    O = I * 5.8 + S__1 + 10.0 * 3.8 * (I–J);
    J = J__1;
    S = S__1;
    Output(O);
}
```

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system to actively control vibration of the ski or a snow board comprising:
   an accelerometer assembly attached to the ski and consisting of at least a single accelerometer to provide measurements of the ski vibration;
   a smart-phone based vibration analyzer, to analyze ski vibration and to generate control signals designed to cancel such vibrations;
   an actuator assembly consisting of at least single MEMS actuator for transferring control signals generated by the vibration analyzer into a vibration dampening force; and
   a radio interface for transferring measurements and control signals between sensor(s), and an actuator(s), and the smart-phone based adaptive vibration control,
   wherein the estimation of ski vibration is provided through a frequency domain analysis of changes in acceleration vectors received form the accelerometer; and wherein after such estimation is obtained, the vibration analyzer generates an inverse matrices of such frequencies, modifies such matrix by the equipment calibration information and the user information, then generates control signal with a frequency and gain identical to ski vibration but with opposite amplitude; and wherein upon receiving such control signals the thermo-electrical MEMS actuator embedded in the actuator assembly produce a reactive force proportional does canceling selected vibration frequencies.

2. The method of claim 1, wherein the accelerometer assembly, consisting an accelerometer capable of measuring acceleration vectors with several degrees of freedom, and communicates such measurements to the smart-hone based vibration analyzer using Personal Area Network radio interface is attached to the ski equipment or embedded in said ski equipment.

3. The method of claim 1, wherein the actuator assembly, consisting one or several MEMS actuators capable of producing displacement at the frequency and force required to cancel ski vibration.

4. The method of claim 3, wherein said actuator assembly is attached, or embedded in the ski equipment.

5. The method of claim 1, wherein the analysis of ski vibration consists of estimation of ski vibration frequencies, and wherein such vibration frequencies are classified as either fundamental or harmonics frequencies, and wherein all fundamental frequencies are retained while all harmonics frequencies are discarded.

6. The method of claim 1, wherein during such vibration analysis, the retained frequencies are further classified into one of three categories: a) natural bending frequencies; b) vibration bending frequencies; c) torsional bending frequencies.

7. The method of claim 1, wherein during such vibration analysis all natural bending frequencies are discarded, while all the vibration bending frequencies and all torsional bending frequencies with the amplitudes above their respective destructive amplitude thresholds are retained.

8. The method of claim 7, wherein the retained frequencies are converted to time domain, scaled by: the equipment calibration information; and the user information, presented as a reference signal to the control loop generating control signals for the actuators.

9. The method of claim 7, wherein such control signal is transmitted to the actuator assembly over the personal area network radio interface, where is transformed into heat causing the thermo-electrical actuators to expand and/or contract, does in effect vibrating with the frequency of ski vibration but with the inverse amplitude and force proportional to the power of ski vibrations.

10. The method of claim 1, wherein the equipment calibration information consist of:
    a ski or snowboard design parameters, which among the others includes such information as: total length, effective length, turning radius, logitudal and torsional stiffness; and
    a ski calibration parameters, which among the others includes such information as: natural deflection due to standard load, natural vibration frequencies and their amplitudes, and natural damping coefficient.

11. The method of claim 1, wherein the user information consist of:
    the user physical characteristics, such as: weight, height;
    the user skiing level, for example—beginner, advanced, and ski response preference parameters, for example—soft, racing, etc.; and
    the slope snow conditions, for example—hard, ice, powder.

12. The method of claim 10, wherein the ski natural deflection of the ski is obtained by placing the ski on support located at ¼ distance from each end of the ski effective length and applying a load of $N_1$ [kg] to the point located at ½ of the ski effective length, while recording the ski center deflection; and wherein, the natural deflection of the ski tip is obtained by placing the support of at the ½ point of the ski effective length and another at the tip-end of the ski effective length, then applying a standard load of $N_2$ [kg] at the ½ distance between the ½ point of the ski effective length and the tip-end of the ski effective length, while recording deflection of ski tip section.

13. The method of claim 10, wherein the center ski natural vibration frequencies and their amplitudes are obtained by placing the ski on support located at ¼ distance from each end of the ski effective length, then applying and instantaneously releasing load of $N_1$ [kg] to the point located at ½ of the ski effective length, while recording ski center vibration frequencies and amplitudes; and wherein, the ski tip natural vibration frequencies and their amplitudes are obtained by placing the support of at the point of the ski effective length and another at the tip-end of the ski effective length, then applying and instantaneously releasing load of $N_2$ [kg] at the ½ distance between the ½ point of the ski effective length and the tip-end of the ski effective length, while recording ski tip vibration frequencies and amplitudes.

14. An apparatus to control ski vibration consisting of:
a multi-axes accelerometer attached to the ski providing measurements of magnitude and direction of acceleration of the ski surface;
means for wirelessly receiving magnitude and direction of the acceleration from an accelerometer;
means estimate ski vibration frequencies and their amplitudes, and to generate control signal intended for cancellation of such vibration;
means for wirelessly transmitting control signals to the actuators attached to the ski equipment; and
an actuator subsystem consisting of a single or multiplicity of thermo-electrical actuators,
wherein, the acceleration vectors received from accelerometer are translated to the frequency domain, and after extraction of fundamental vibration frequencies and appropriate thresholding of the vibration amplitudes, the residual frequencies are converted to the time domain, scaled by the ski calibration information and the user information, then applied to the control loop for the generation of the control signal intended to cancel ski vibration; and wherein upon reception of the control signal, the thermo-electrical actuators provide linear expansion does producing force for the extension cores coupled to the actuators does canceling ski vibration.

15. The method of claim 14, wherein the number and orientation of actuator/extension core assemblies inside the actuator subsystem may be logitudal for canceling only the bending vibrations or longitudinal and transversal, or longitudinal and transversal, or any combination thereof, for canceling of both the bending and the torsional vibrations.

16. The method of claim 14, wherein the actuator subsystem is attached to the ski or embedded into the ski core.

17. The method of claim 14, wherein the ski vibration damping coefficient is scaled by the ski calibration information and the user information before it is applied as a reference to produce the vibration control signal.

18. A non-transitory computer accessible memory medium for storing program instruction pertaining to a ski vibration control systm, wherein the program instructions are executable to:
retrieve magnitudes and amplitudes of acceleration form multi-axes accelerometer using short-range wireless link;
perform analysis of such acceleration vector in order to estimate ski vibration;
scaling of the residual vibration estimates by the: first, second and third information, then applying such result as a reference signal for the actuator control loop; and
transmitting the resulting control signal to the actuators,
wherein the first information consist of ski design parameters, wherein the second information consists of ski calibration parameters, and wherein the third information consists of user physical and preference parameters.

19. The memory medium of claim 18, wherein the vibration analysis consists of:
performing of an DFT (Discrete Fourier Transform) of the time domain samples received form an multi-axes accelerometer to estimate vibration frequencies and their respective amplitudes;
retaining all fundamental frequencies while discarding all harmonic frequencies;
storing the bending frequencies, and the torsional frequencies in their respective frequency bins;
applying bending and torsional thresholds to the respective frequency bins and discarding all frequencies with amplitudes falling below the respective thresholds;
adding the remaining frequency matrixes and generate the time domain representation of the result through the IDFT (Inverse Discrete Fourier Transform).

20. The memory medium of claim 18, wherein the scaled estimates of the residual vibration is applied to a $2^{nd}$ order control loop as a reference to control loop generating control signals canceling such residual vibration.

* * * * *